United States Patent
Zechman

(10) Patent No.: US 10,862,281 B2
(45) Date of Patent: Dec. 8, 2020

(54) FISH TAPE COUPLING ASSEMBLY

(71) Applicant: Randy Zechman, Littlestown, PA (US)

(72) Inventor: Randy Zechman, Littlestown, PA (US)

( * ) Notice: Subject to any disclaimer, the term of this patent is extended or adjusted under 35 U.S.C. 154(b) by 95 days.

(21) Appl. No.: 16/134,248

(22) Filed: Sep. 18, 2018

(65) Prior Publication Data

US 2019/0089138 A1 Mar. 21, 2019

Related U.S. Application Data

(60) Provisional application No. 62/560,974, filed on Sep. 20, 2017.

(51) Int. Cl.
*H02G 1/08* (2006.01)

(52) U.S. Cl.
CPC .................. *H02G 1/083* (2013.01)

(58) Field of Classification Search
CPC ............ H02G 1/083; H02G 1/06; H02G 1/08; H02G 1/081; H02G 1/088; H02G 1/085; H02G 3/00; B23Q 3/005; B23Q 3/00; B23Q 5/22; B23Q 5/00; G02B 6/4465; G02B 6/44; G02B 6/4438; B65H 2701/376; B65H 51/18; B65H 75/364
USPC .................... 254/134.3 FT, 134.3 R
See application file for complete search history.

(56) References Cited

U.S. PATENT DOCUMENTS

| | | | |
|---|---|---|---|
| 1,049,825 A | 1/1913 | Dubruiel | |
| 2,980,398 A | 4/1961 | Raney | |
| 3,479,013 A * | 11/1969 | Williams | H02G 1/083 |
| | | | 254/134.3 R |
| 5,938,180 A * | 8/1999 | Walsten | H02G 1/083 |
| | | | 254/134.3 FT |
| 6,945,515 B2 | 9/2005 | Diggle, III | |
| D715,168 S | 10/2014 | Martinez | |
| 10,274,106 B2 * | 4/2019 | Baumgartner | F16L 1/06 |
| 2004/0007700 A1 * | 1/2004 | Hazel | H02G 1/081 |
| | | | 254/134.3 FT |
| 2008/0017837 A1 | 1/2008 | Steele | |
| 2011/0001099 A1 | 1/2011 | Scutari | |
| 2017/0085066 A1 * | 3/2017 | Buck | H02G 1/081 |

* cited by examiner

*Primary Examiner* — Lee D Wilson
*Assistant Examiner* — Robert F Neibaur

(57) ABSTRACT

A fish tape coupling assembly includes a fish tape that includes a spool and a wire, and the wire has a distal end. A tube is provided that is comprised of a flexible material thereby facilitating the tube to pass through bends in a conduit. The tube is releasably coupled to the distal end of the wire when the wire has been extended through a conduit to draw the tube through the conduit. A plurality of sleeves is provided and a selected one of the sleeves is removably coupled to the tube. The selected sleeve has the wire extended therethrough when the wire is extended into the tube. Each of the sleeves tapers longitudinally such that each of the sleeves has a bullet shape. The selected sleeve coupled to the tube is inhibited from engaging bends in the conduit when the wire is drawn through the conduit.

4 Claims, 6 Drawing Sheets

FISH TAPE COUPLING ASSEMBLY

CROSS-REFERENCE TO RELATED APPLICATIONS

I hereby claim the benefit under 35 U.S.C. Section 119(e) of U.S. Provisional application 62/560,974 filed on Sep. 20, 2017.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to coupling devices and more particularly pertains to a new coupling device for pulling tubes or wires through a conduit with bends and joints.

BRIEF SUMMARY OF THE INVENTION

An embodiment of the disclosure meets the needs presented above by generally comprising a fish tape that includes a spool and a wire, and the wire has a distal end. A tube is provided that is comprised of a flexible material thereby facilitating the tube to pass through bends in a conduit. The tube is releasably coupled to the distal end of the wire when the wire has been extended through a conduit to draw the tube through the conduit. A plurality of sleeves is provided and a selected one of the sleeves is removably coupled to the tube. The selected sleeve has the wire extended therethrough when the wire is extended into the tube. Each of the sleeves tapers longitudinally such that each of the sleeves has a bullet shape. The selected sleeve coupled to the tube is inhibited from engaging bends in the conduit when the wire is drawn through the conduit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
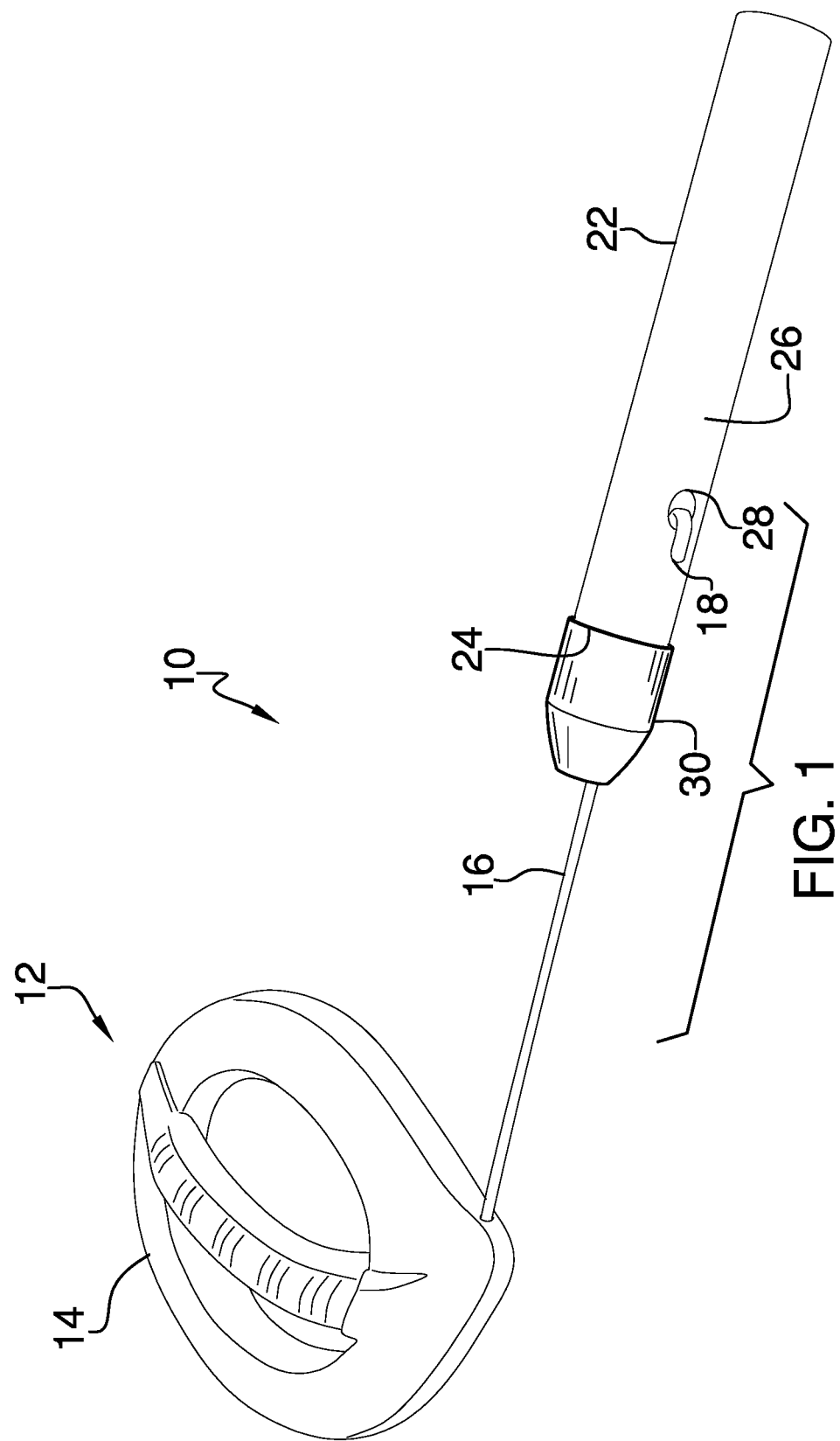
FIG. 1 is a perspective view of a fish tape coupling assembly according to an embodiment of the disclosure.
Figure 2:
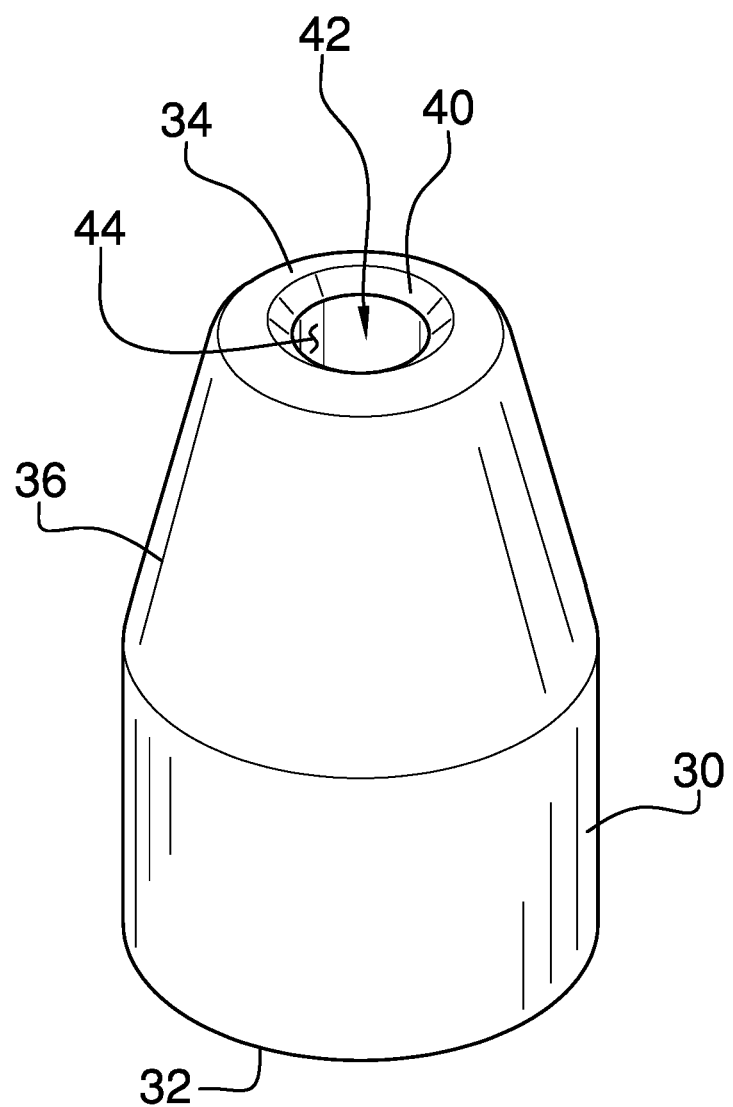
FIG. 2 is a perspective view of a sleeve of an embodiment of the disclosure.
Figure 3:
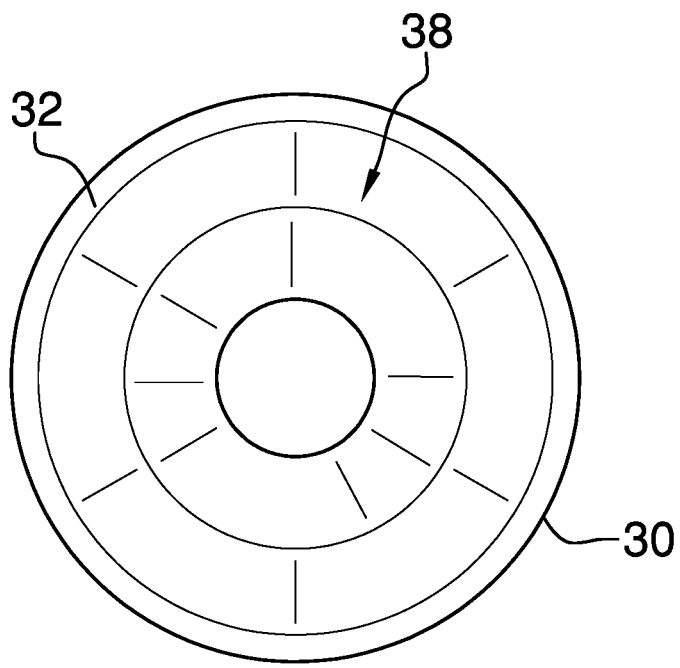
FIG. 3 is a back view of a sleeve of an embodiment of the disclosure.
Figure 4:
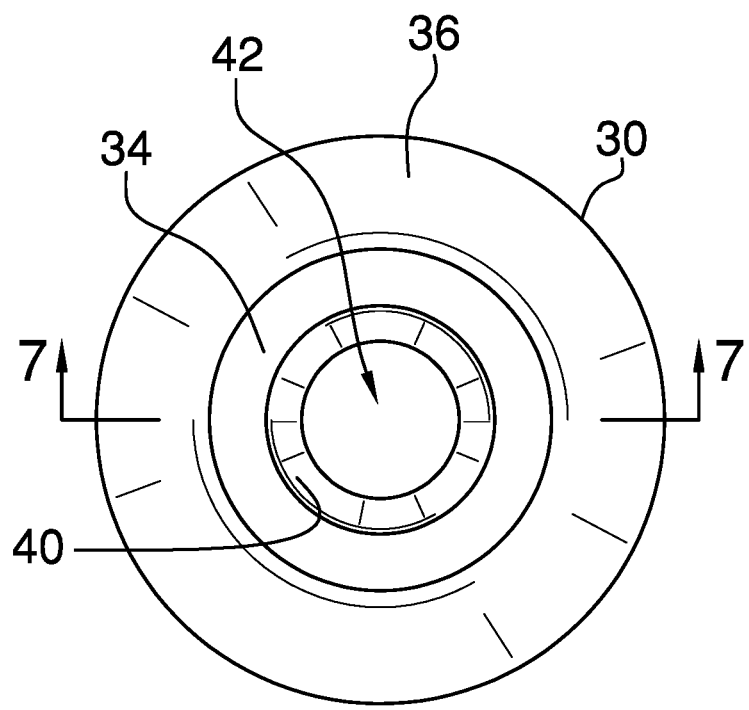
FIG. 4 is a front view of a sleeve of an embodiment of the disclosure.
Figure 5:
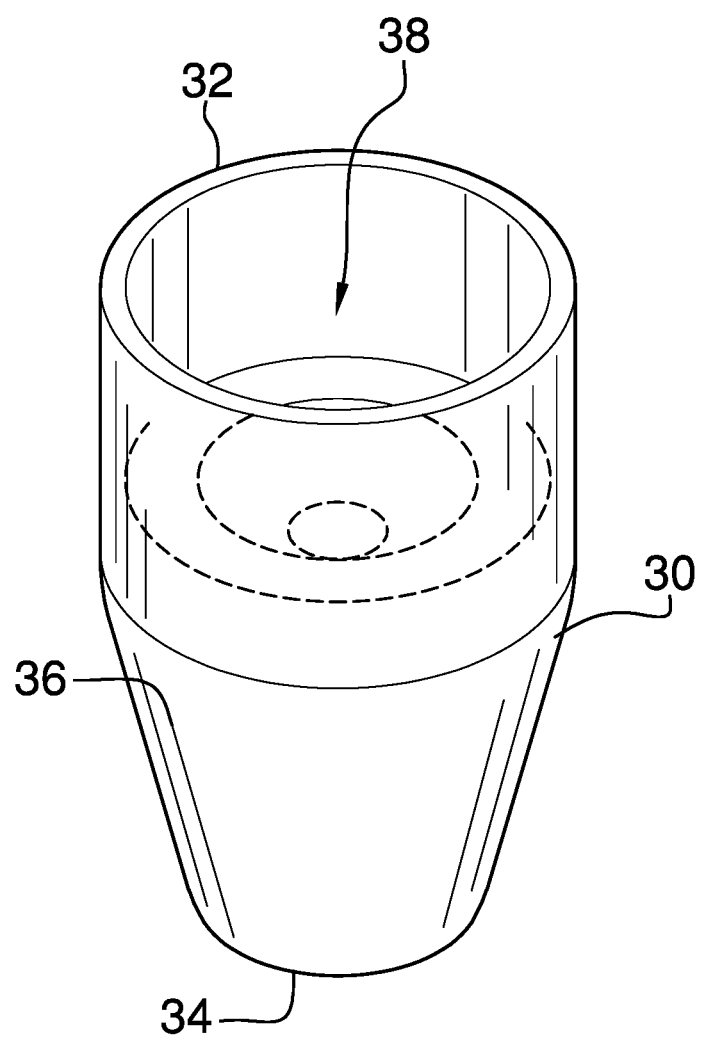
FIG. 5 is a perspective phantom view of an embodiment of the disclosure.
Figure 6:
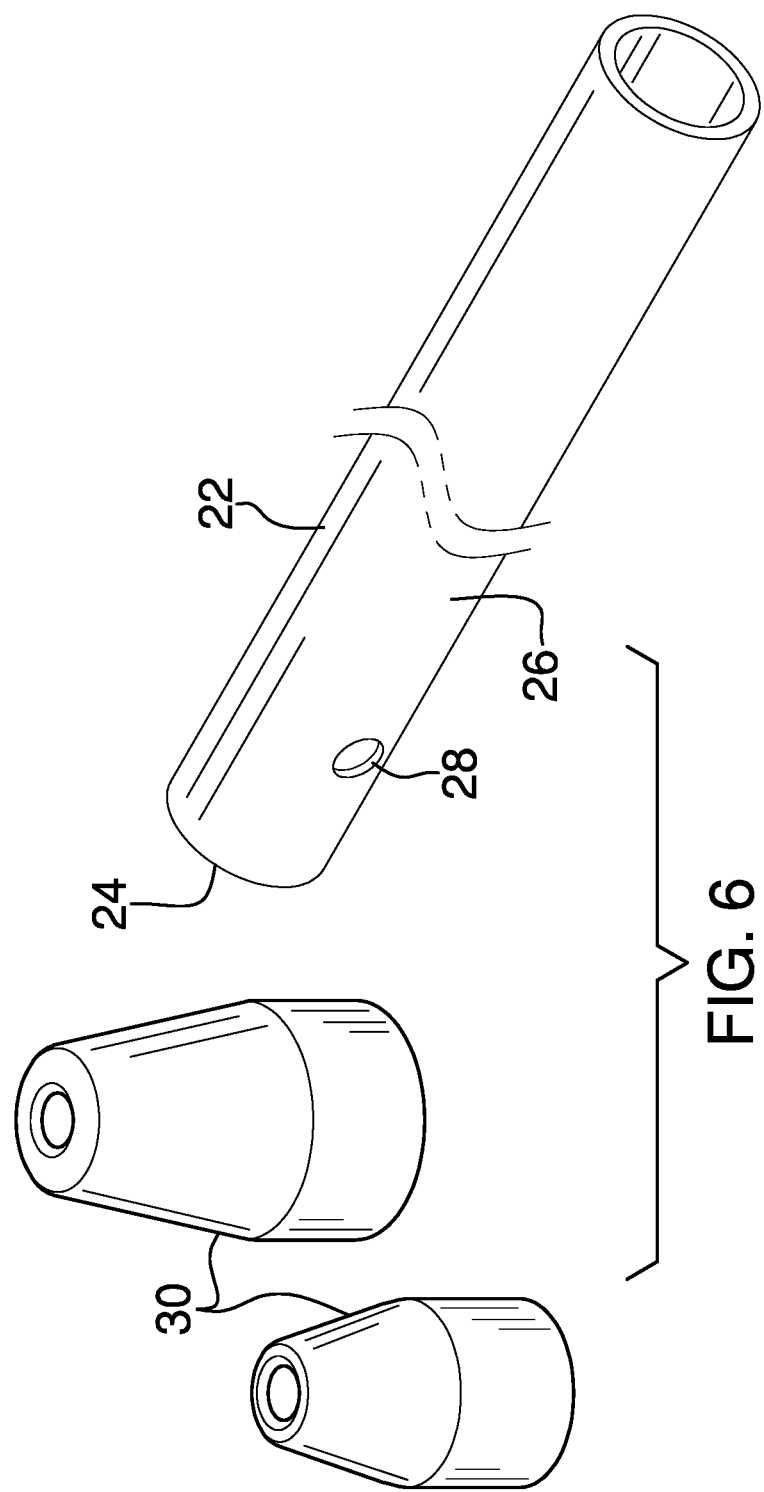
FIG. 6 is a perspective view of a plurality of sleeves and a tube of an embodiment of the disclosure.
Figure 7:
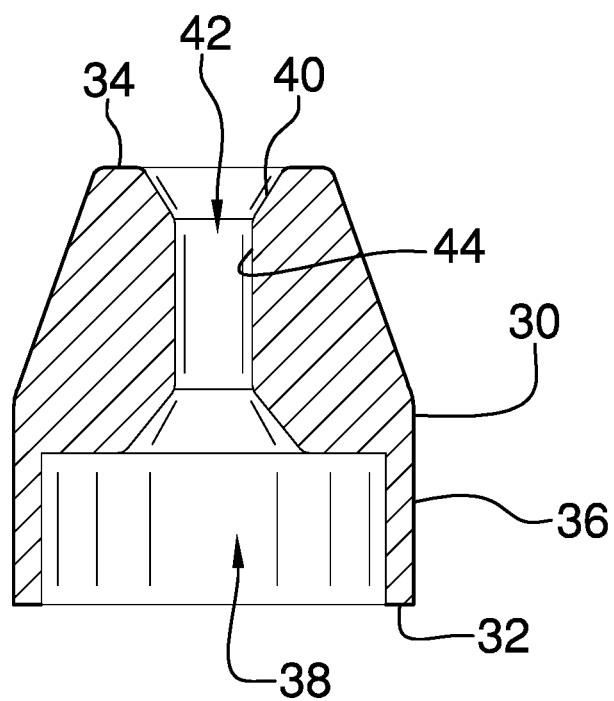
FIG. 7 is a cross sectional view taken along line 7-7 of FIG. 4 of an embodiment of the disclosure.

With reference now to the drawings, and in particular to FIGS. 1 through 7 thereof, a new coupling device embodying the principles and concepts of an embodiment of the disclosure and generally designated by the reference numeral 10 will be described.

As best illustrated in FIGS. 1 through 7, the fish tape coupling assembly 10 generally comprises a fish tape 12 that includes a spool 14 and a wire 16. The wire 16 has a distal end 18 with respect to the spool 14 and the wire 16 is selectively drawn outwardly from the spool 14 and selectively drawn inwardly on the spool 14. The fish tape 12 may be a fish tape of any conventional design, including but not being limited to, metal fish tapes and fiberglass fish tapes. Moreover, the fish tape 12 is selectively urged through a conduit, or other similar passage, such as would be found in a multistory building or the like through which electrical cabling or other elongated objects can be routed.

A tube 22 is included and the tube 22 is comprised of a flexible material. In this way the tube 22 can deform to facilitate the tube 22 to pass through bends in the conduit. The tube 22 is releasably coupled to the distal end 18 of the wire 16 when the wire 16 has been extended through the conduit. In this way the fish tape 12 can draw the tube 22 through the conduit. The tube 22 has a primary end 24 and an outer wall 26, and the outer wall 26 has an aperture 28 extending into an interior of the tube 22. The distal end 18 of the wire 16 is passed through the primary end 24 and engages the aperture 28 for releasably coupling the tube 22 to the wire 16.

A plurality of sleeves 30 is provided and a selected one of the sleeves 30 is removably coupled to the tube 22. The selected sleeve 30 has the wire 16 extended therethrough when the wire 16 is extended into the tube 22. Each of the sleeves 30 tapers longitudinally such that each of the sleeves 30 has a bullet shape. In this way the selected sleeve 30 that is coupled to the tube 22 is inhibited from engaging bends in the conduit when the wire 16 is drawn through the conduit. In this way the tube 22, or other elongated object, can be drawn through the conduit without frictionally engaging joints, bends or other obstacles in the conduit.

Each of the sleeves 30 has a first end 32, a second end 34 and an outer wall 36 extending therebetween. The first end 32 of each of the sleeves 30 has a well 38 extending toward said second end 34 and the outer wall 36 tapers inwardly between the well 38 and second end 34. The well 38 in the selected sleeve 30 insertably receives the primary end 24 of the tube 22. The wire 16 is extendable through the selected sleeve 30 when the selected sleeve 30 is coupled to the tube 22.

Each of the sleeves 30 has a unique outside diameter with respect to each other. In this way each of the sleeves 30 can be coupled to an object that has a corresponding diameter. The second end 34 of each sleeve 30 is open and a bounding edge 40 of the opening 42 in the second end 34 is chamfered between the second end 34 an internal bounding surface 44 of the opening 42. Additionally, an intersection between the well 38 and the opening 42 is chamfered.

In use, the fish tape 12 is urged through the conduit to facilitate with wire 16 to draw a wire 16, tube 22, pipe or other elongated object through the conduit. The distal end 18 of the wire 16 is passed through the selected sleeve 30 and the primary end 24 of the tube 22. Moreover, the distal end 18 of the wire 16 is manipulated to engage the aperture 28 in the tube 22 and primary end 24 of the tube 22 is inserted into the well 38 in the selected sleeve 30. The wire 16 is drawn back through the conduit thereby urging the sleeve and the tube 22 through the conduit. The tapered shape of the selected sleeve 30 facilitates the sleeve to pass through bends or joints in the conduit. Additionally, the selected sleeve 30 inhibits the primary end 24 of the tube 22 from engaging the bends or joints in the conduit. In this way the fish tape 12 can successfully draw the tube 22, or other elongated object, through the conduit regardless of bends and joints in the conduit.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fish tape coupling assembly being configured to facilitate an object to be drawn through an angled conduit, said assembly comprising:

a fish tape including a spool and a wire, said wire having a distal end with respect to said spool, said wire being selectively drawn outwardly from said spool and selectively drawn inwardly on said spool;

a tube being comprised of a flexible material wherein said tube is configured to pass through bends in a conduit, said tube being releasably coupled to said distal end of said wire when said wire has been extended through a conduit wherein said fish tape is configured to draw said tube through the conduit, said tube having a primary end and an outer wall, said outer wall having an aperture extending into an interior of said tube, said distal end of said wire being passed through said primary end and engaging said aperture for releasably coupling said tube to said wire; and a plurality of sleeves, a selected one of said sleeves being removably coupled to said tube, said selected sleeve having said wire being extended therethrough when said wire is extended into said tube, each of said sleeves tapering longitudinally such that each of said sleeves has a portion shaped as a truncated cone wherein said selected sleeve coupled to said tube is inhibited from engaging bends in the conduit when said wire is drawn through the conduit.

2. The assembly according to claim 1, wherein each of said sleeves has a first end, a second end and an outer wall extending therebetween, said first end having a well therein extending toward said second end, said outer wall tapering inwardly between said well and said second end, said well insertably receiving said primary end of said tube, said wire being extendable through said selected sleeve when said selected sleeve is coupled to said tube.

3. The assembly according to claim 1, wherein each of said sleeves has a unique outside diameter with respect to each other.

4. A fish tape coupling assembly being configured to facilitate an object to be drawn through an angled conduit, said assembly comprising:

a fish tape including a spool and a wire, said wire having a distal end with respect to said spool, said wire being selectively drawn outwardly from said spool and selectively drawn inwardly on said spool;

a tube being comprised of a flexible material wherein said tube is configured to pass through bends in a conduit, said tube being releasably coupled to said distal end of said wire when said wire has been extended through a conduit wherein said fish tape is configured to draw said tube through the conduit, said tube having a primary end and an outer wall, said outer wall having an aperture extending into an interior of said tube, said distal end of said wire being passed through said primary end and engaging said aperture for releasably coupling said tube to said wire; and a plurality of sleeves, a selected one of said sleeves being removably coupled to said tube, said selected sleeve having said wire being extended therethrough when said wire is extended into said tube, each of said sleeves tapering longitudinally such that each of said sleeves has a portion shaped as a truncated cone wherein said selected sleeve coupled to said tube is inhibited from engaging bends in the conduit when said wire is drawn through the conduit, each of said sleeves having a first end, a second end and an outer wall extending therebetween, said first end of each of said sleeves having a well extending toward said second end, said outer wall tapering inwardly between said well and said second end, said well in said selected sleeve insertably receiving said primary end of said tube, said wire being extendable through said selected sleeve when said selected sleeve is coupled to said tube, each of said sleeves having a unique outside diameter with respect to each other.

* * * * *